United States Patent [19]
Nielson

[11] Patent Number: 4,832,079
[45] Date of Patent: May 23, 1989

[54] DUAL VALVE SYSTEM
[75] Inventor: David L. Nielson, Orchard, Nebr.
[73] Assignee: Sterner Industries, Inc., Winsted, Minn.
[21] Appl. No.: 168,379
[22] Filed: Mar. 15, 1988
[51] Int. Cl.[4] .............................................. F16K 1/22
[52] U.S. Cl. ................................... 137/613; 251/148; 251/306
[58] Field of Search ............... 137/315, 613; 251/304, 251/305, 306, 129.11, 148, 152

[56] References Cited
U.S. PATENT DOCUMENTS

| 3,904,170 | 9/1975 | Curran | 251/152 |
| 4,020,869 | 5/1977 | Davis et al. | 137/613 |
| 4,148,458 | 4/1979 | Holtgraver | 251/306 |
| 4,552,332 | 11/1985 | Sonderegger et al. | 251/148 |

FOREIGN PATENT DOCUMENTS

| 3042895 | 5/1982 | Fed. Rep. of Germany | 251/305 |
| 3221372 | 12/1983 | Fed. Rep. of Germany | 137/613 |
| 2451529 | 9/1980 | France | 137/613 |

Primary Examiner—A. Michael Chambers
Attorney, Agent, or Firm—Merchant, Gould, Smith, Edell, Welter, & Schmidt

[57] ABSTRACT

A dual disk valve system which may be quickly, easily and inexpensively repaired. The system comprises (i) a central conduit, (ii) a pair of end conduits securely yet detachably coupled to each end of the central conduit to form a single continuous conduit, (iii) a bearing ring, constructed of a pliable material, occupying an inner annular cavity at the junction of each of the end conduits with the central conduit, and (iv) a rotatable disk valve at the junction of the end conduits and the central conduit which may be rotatably or sealingly engaged against the bearing ring to prevent flow therethrough.

Normal wear of the system is limited to the bearing rings which may be quickly, easily and inexpensively replaced by separating the central and end conduits.

12 Claims, 2 Drawing Sheets

DUAL VALVE SYSTEM

FIELD OF THE INVENTION

Broadly, my invention relates to valves. More specifically, my invention relates to dual valve systems suitable for removing material from a pressurized or vacuumized chamber without a substantial loss of pressure or vacuum.

BACKGROUND OF THE INVENTION

Flowable material is typically removed from pressurized and vacuumized chambers with dual valve systems as such systems allow material to be removed from the chamber without a substantial loss in the pressure or vacuum. Typical dual valve systems comprise a pair of longitudinally aligned, cooperatively operational disk valves which sealingly contact the inner wall of the surrounding conduit when closed. The disk valves define a transition chamber therebetween.

Material is conveyed through dual valve systems by closing the bottom-most valve, opening the top-most valve so as to allow material to flow into the transition chamber, closing the top-most valve, and opening the bottom-most valve so as to allow the material in the transition chamber to flow out of the system.

Unfortunately, the valve to conduit contact points in typical dual valve systems tend to quickly wear to the point where a tight seal is no longer possible and repair is necessary. To repair the typical dual valve system it is necessary to replace the valves and either replace and/or rebore the conduit; a difficult, time consuming and costly job.

Accordingly, a need exists for a dual valve system which may be quickly, easily and inexpensively repaired.

SUMMARY OF THE INVENTION

Figure 1:
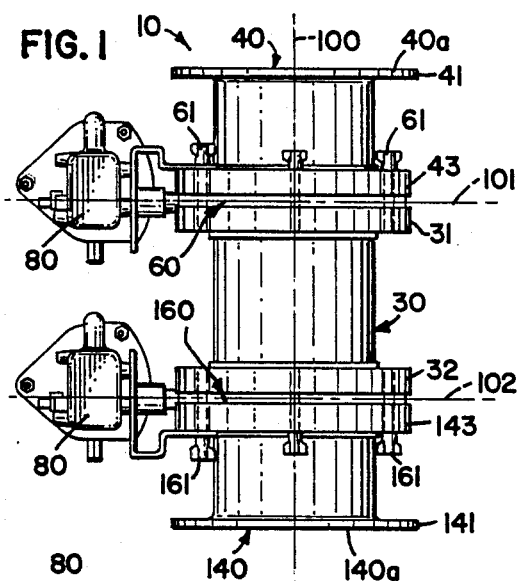
FIG. 1 is a front view of one embodiment of my invention.

My invention is a dual valve system which may be quickly, easily and inexpensively repaired, which comprises: (a) a central conduit; (b) first and second end conduits securely yet detachable coupled to the top and bottom of the central conduit so as to form a continuous conduit; the coupled first end conduit and central conduit defining a first pair of laterally opposed latitudinal apertures and a first inner annular channel at the junction thereof, and the coupled second end conduit and central conduit defining a second pair of laterally opposed latitudinal apertures and a second inner annular channel at the junction thereof; (c) first and second pliable bearing rings securely yet detachably occupying the first and second inner annular channels; the first baring ring having a first pair of laterally opposed holes aligned with the first pair of apertures so as to form a first pair of axially aligned, continuous, latitudinal openings and the second bearing ring having a second pair of laterally opposed holes aligned with the second pair of apertures so as to form a second pair of axially aligned, continuous, latitudinal openings; (d) a first disk valve securely yet removably and rotatably occupying the continuous conduit at approximately the junction of the central conduit and the first end conduit; the first disk valve (i) supported by a first pair of axial extensions which pass through the first pair of openings, and (ii) capable of preventing passage through the continuous conduit when seated against the first bearing ring; and (e) a second disk valve securely yet removably and rotatably occupying the continuous conduit at approximately the junction of the central conduit and the second end conduit; the second disk valve (i) supported by a second pair of axial extensions which pass through the second pair openings, and (ii) capable of preventing passage through the continuous conduit when seated against the second bearing ring.

In operation, material is conveyed through my dual valve system by closing the bottom-most disk, opening the top-most disk so as to allow material to flow into the central conduit, closing the top-most disk, and opening the bottom-most disk so as to allow the material contained in the central conduit to flow out of the system. Alternating the opening and closing of the disks allows material to be removed from a pressurized or vacuumized vessel without a substantial loss of pressure or vacuum.

The pliable bearing rings in my system will eventually wear to the point where a tight seal may no longer be maintained. The pliability of the bearing rings should significantly reduce wear on the disk valve and, under normal operating conditions, no other component of my system should wear such that it must be routinely replaced. To replace the worn bearing rings the system must be shut down, the end conduits detached from the central conduit to split the apertures and the annular channels, to the bearing rings and disk valves removed from the split inner annular channels, the disk valves removed from the bearing rings by flexing the sides of the bearing rings inward so that the holes in the bearing ring extend beyond the axial extensions of the disk valves, the worn bearing rings replaced, and the system reassembled.

DETAILED DESCRIPTION OF MY INVENTION INCLUDING A BEST MODE

Figure 2:
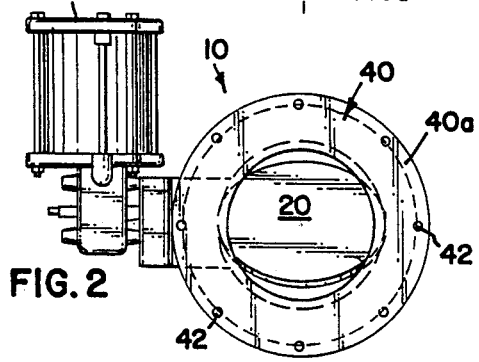
FIG. 2 is a top view of the embodiment depicted in FIG. 1.
Figure 3:
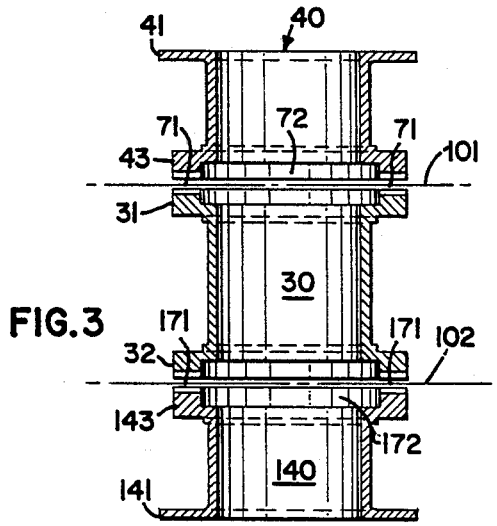
FIG. 3 is an expanded, perspective view of the embodiment depicted in FIG. 1.
Figure 4:
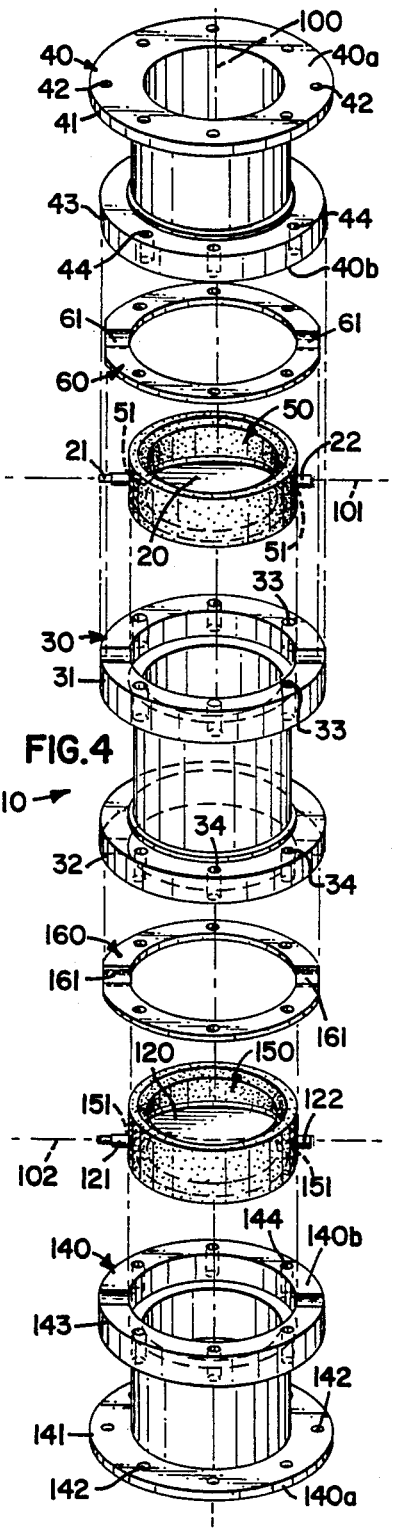
FIG. 4 is a front, cross-sectional view of the embodiment depicted in FIG. 1 with the bearing rings (50 and 150), gaskets (60 and 160) and valves (20 and 120) removed.
Figure 7:
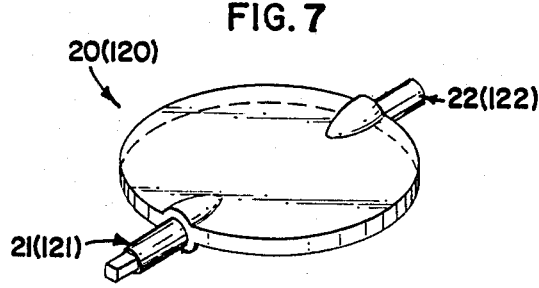
FIG. 7 is an enlarged, perspective view of a disk valve (20 and 120).
Figure 8:
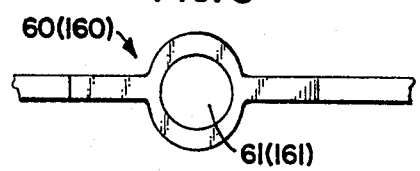
FIG. 8 is an enlarged, side view of a portion of a gasket (60 and 160).
Figure 5:
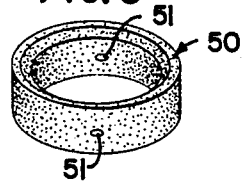
FIG. 5 is a perspective view of the bearing ring 50 shown in FIG. 4.
Figure 6:
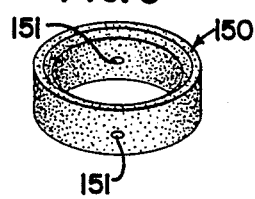
FIG. 6 is a perspective view of the bearing ring 150 shown in FIG. 4.

Referring to FIGS. 1 through 8, my dual valve system 10 comprises two butterfly valves 20 and 120 axially aligned along longitudinal axis 100 on either side of a central conduit 30. Valves 20 and 120 each have a pair of extensions, 21 and 22 on valve 20 and 121 and 122 on valve 120, axially aligned along latitudinal axis 101 and 102, respectively. Valves 20 and 120 are located at the junction of central conduit 30 and end conduits 40 and 140, respectively.

Central conduit 30 and end conduits 40 and 140 define (i) two pair of apertures 71 and 171 axially aligned along latitudinal axis 101 and 102, respectively, and (ii)

two inner annular channels 72 and 172, at the junction of central conduit 30 and end conduit 40 and at the junction of central conduit 30 and end conduit 140, respectively.

The inner annular channels 72 and 172 are sealingly occupied by pliable bearing rings 50 and 150, respectively. Bearing rings 50 and 150 each have a pair of holes 51 and 151 axially aligned along latitudinal axis 101 and 102, respectively. Valve extension pairs 21-22 and 121-122 pass through holes 51 and 151 in bearing rings 50 and 150 and through apertures 71 and 171 in conduits 30, 40 and 140 and act as a rotatable support for valves 20 and 120, respectively.

In the preferred embodiment gaskets 60 and 160 sealingly occupy the gap between central conduit 30 and end conduits 40 and 140, respectively. Gaskets 60 and 160 each have a pair of laterally opposed, latitudinal orifices 61 and 161 axially aligned along latitudinal axis 101 and 102, respectively. Gaskets 60 and 160 may be constructed from any of the materials typical employed for gaskets.

The distal end 40a of end conduit 40 and the distal end 140a of end conduit 140 each define an outer flange 41 and 141, respectively. Flanges 41 and 141 each contain a plurality of longitudinal bolt holes 42 and 142, respectively, for allowing my dual valve system 10 to be securely yet detachably coupled to other equipment.

Proximal ends 40b of end conduit 40 and 140b of end conduit 140 also define an outer flange 43 and 143, respectively. Flanges 43 and 143, like flanges 41 and 141, each contain a plurality of longitudinal bolt holes 44 and 144, respectively, for allowing the end conduits 40 and 140 to be securely yet detachably coupled to the central conduit 30.

Central conduit 30 has an upper outer flange 31 and a lower outer flange 32. Flanges 31 and 32 each have a plurality of threaded, longitudinal bolt holes 33 and 34, respectively, for allowing the central conduit 30 to be securely yet detachable coupled to end conduits 40 and 140. Holes 44 in end conduit 40 and holes 33 in central conduit 30 are aligned so that bolts 61 may pass through holes 44 and be threaded into holes 33 to securely yet detachably couple end conduit 40 with central conduit 30 and sealingly engage bearing ring 50 into inner annular channel 71 and gasket 60 between flanges 43 and 31. Likewise, holes 144 in end plate 140 and holes 34 in central conduit 30 are aligned so that bolts 161 may pass through holes 144 and be threaded into holes 34 to securely yet detachably couple end conduit 140 with central conduit 30 and sealingly engage bearing ring 150 into annular channel 171 and gasket 160 between flanges 143 and 32.

Bearing rings 50 and 150 should be slightly taller than the annular cavities 71 and 171 which they occupy so that the bearing rings 50 and 150 will sealing contact central conduit 30 and end conduits 40 and 140, respectively, when bolts 61 and 161 are tightened.

Axial extensions 21 and 121 of valves 20 and 120, respectively, are coupled to a means 80 for alternately rotating disks 20 and 120, to open and closed positions. Any of the well known means for achieving such alternate rotation of valves 20 and 120 may be employed including the pneumatic system 80 depicted in FIGS. 1 and 2.

When in the closed position, disks 20 and 120 will sealingly engage bearing rings 50 and 150, respectively, such that no contact occurs between valves 20 and 120 and conduits 30, 40 and 140.

In order to prevent substantial wear of valves 20 and 120 and provide easy removal of bearing rings 50 and 150 from around disks 20 and 120 during repair, bearing rings 50 and 150 are preferably constructed of a pliable material such as vulcanized rubber, neoprene, vitow, etc.

The intended use of valve 10 will define the preferred material of construction for those components which contact the conveyed material. When employed in the processing of food, it is preferred to construct conduits 30, 40 and 140 and valves 20 and 120 from aluminum or stainless steel to prevent the addition of an off taste to the food and to prevent contamination.

The longitudinal length of conduits 30, 40 and 140 may be varied as necessary. The length of central conduit 30 defines the volume of material which maybe conveyed with each opening and closing of valves 20 and 120. The length of end conduits 40 and 140 are chosen to provide sufficient space for valves 20 and 120 to rotate, to provide sufficient space between the outer flanges 41-43 and 141-143 for bolts to be inserted into bolt holes 42-44 and 142-144, and bridge the gap between the pieces of equipment on either side of my dual valve system 10. The other dimensions of my system 10 may be chosen as desired.

I claim:
1. A valve, comprising:
   (a) a central conduit having a top and a bottom;
   (b) a first end conduit, having a distal end and a proximal end, detachably and securely coupled to the top of the central conduit so as to form a continuous conduit therewith; the coupled first end conduit and central conduit defining a first pair of axially opposed apertures and a first inner annular channel at the junction thereof;
   (c) a second end conduit, having a distal end and a proximal end, detachably and securely coupled to the bottom of the central conduit so as to form a continuous conduit therewith, the coupled second end conduit and central conduit defining a second pair of axially opposed apertures and a second inner annular channel at the junction thereof;
   (d) a first bearing ring removable and securely occupying the first annular channel and having a first pair of holes aligned with the first pair of apertures to form a first pair of axially aligned openings through the first bearing ring and the coupled central conduit and first end conduit;
   (e) a second bearing ring removably and securely occupying the first annular channel and having a second pair of holes aligned with the second pair of apertures to form a second pair of axially aligned openings through the second bearing ring and the coupled central conduit and second end conduit;
   (f) a first disk valve, removably, securely and rotatably occupying the continuous conduit formed by the central conduit and first and second end conduits, at approximately the junction of the central conduit and the first end conduit, so as to prevent passage through the continuous conduit when seated against the first bearing ring; the first disk valve having a first pair of axial extensions which extend through the first pair of openings and support the first disk valve in the continuous conduit; and
   (g) a second disk valve, removably, securely and rotatably occupying the continuous conduit formed by the central conduit and first and second end conduits, at approximately the junction of the central conduit and the second end conduit, so as to prevent passage through the continuous conduit, when seated against the second bearing ring; the second disk valve having a second pair of axial extensions which extend through the second pair of openings and support the second disk valve in the continuous conduit;

(h) whereby the bearing rings may be removed and replaced while the combination of disk valve and axial extensions associated with the bearing ring remain coupled.

2. The valve of claim 1 further comprising two gaskets, one between the central conduit and the first end conduit and one between the central conduit and the second end conduits to seal connection of the conduits.

3. The valve of claim 1 further comprising a means, at the distal ends of the first and second end conduits, for detachably and securely coupling the valve inline.

4. The valve of claim 1 further comprising a means for alternately opening the first and second disk valves to the passage of material therethrough.

5. The valve of claim 1 wherein the central conduit has a top exterior flange and a bottom exterior flange, the first end conduit has a first exterior flange proximate the top exterior flange and the second end conduit has a second exterior flange proximate the bottom exterior flange; the top and first flanges having a plurality of corresponding longitudinal apertures through which fasteners are inserted to detachably and securely couple the central conduit to the first end conduit and the bottom and second flanges having a plurality of corresponding longitudinal apertures through which fasteners are inserted to detachably and securely couple the central conduit to the second end conduit.

6. The valve of claim 5 wherein the apertures in the central conduit are threaded and each fastener comprises a bolt.

7. The valve of claim 3 wherein the inline coupling means comprises a first exterior distal flange on the distal end of the first end conduit having a plurality of longitudinal apertures through which fasteners may be inserted and a second exterior distal flange on the distal end of the second end conduit having a plurality of longitudinal apertures through which fasteners may be inserted.

8. The valve of claim 1 wherein the bearing rings comprise a pliable material and sealingly engage the central and end conduits.

9. The valve of claim 8 wherein the pliable material is selected from the group consisting of vulcanized rubber, neoprene and vitow.

10. The valve of claim 1 wherein the first and second disk valves comprise butterfly valves.

11. The valve of claim 1 wherein the central conduit, first end conduit, second end conduit, first disk valve and second disk valve comprise stainless steel.

12. The valve of claim 4 wherein the means for alternately opening the first and second disk valve is selected from the group consisting of pneumatic and mechanical actuators.

* * * * *